Patented Aug. 8, 1950

2,518,154

UNITED STATES PATENT OFFICE 2,518,154

N-ALPHA-AURO-MERCAPTO-ACETYL-AMINOPHENOLS

Mozes Juda Lewenstein, Kew Gardens, N. Y.

No Drawing. Application December 16, 1947,
Serial No. 792,099

4 Claims. (Cl. 260—430)

This invention relates to pharmaceutical compounds and in particular is directed to compounds used for the treatment of arthritis and other diseases.

In my pending application, Serial No. 376,841, now Patent No. 2,451,841 granted October 19, 1948 I have described the N-alpha-auro-mercapto-acetanilide, $C_6H_5.NH.CO.CH_2.SAu$, which is a compound valuable for the treatment of arthritis and other diseases. That compound, in the form of an oily suspension, is administered parenterally. It is absorbed by the body at a slow rate owing to its low solubility. The resulting gold-level in the body permits effective treatment with hardly any of the disadvantageous side-reactions that often accompany the use of soluble gold preparations.

I have felt that in some cases it is desirable to use a product which would be absorbed at a rate faster than the above mentioned compound, but nevertheless much more slowly than a water-soluble compound.

It is therefore the principal object of this invention to provide an improved compound for use in the treatment of arthritis and other diseases. Further objects will become apparent from the following description of the invention.

The principal object may be achieved by the use of the N-alpha-auro-mercapto-acetyl-aminophenols, and their acyl homologues, as for example, the corresponding N-auro mercapto propionyl and butyryl aminophenols. These compounds, which are related to the N-alpha-auro-mercapto-acetanilide in that the aromatic nucleus contains a hydroxyl group as a substituent for one of the hydrogen atoms of the phenyl radical, provide a faster rate of absorption than the aforesaid auro-mercapto acetanilide on account of the phenolic hydroxyl group. These compounds are prepared from their parent mercaptans which are derived from the corresponding alpha carbamyl mercapto compounds. These mercaptans and their parent carbamyl mercapto compounds are valuable for their own properties, as they have been used with good results as detoxifying agents in acute poisoning. These compounds are also useful as intermediates in the preparation of the N-auro-mercapto-acyl-aminophenols.

Accordingly, the compounds of this invention have the following type formula:

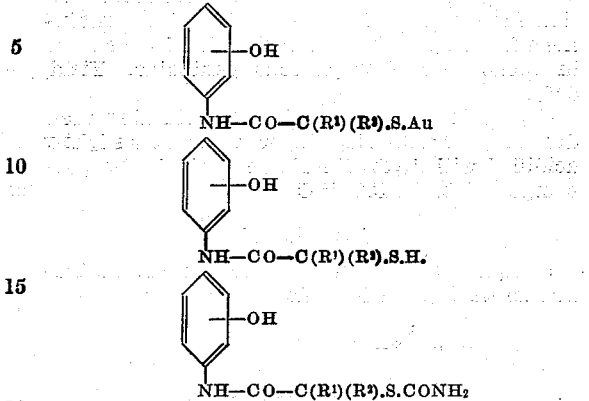

wherein $R^1$ and $R^2$ are selected from the group of hydrogen and lower alkyl.

Example I

N-alpha-carbamyl-mercapto-acetyl-ortho-aminophenol having the formula

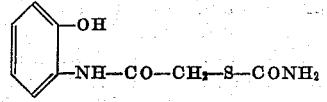

91 grams of monochloroacetic acid and 350 cc. of methanol were brought to ebullition under reflux, on the steam-cone, and 70 grams of ortho-aminophenol was added in small portions. The resulting solution was treated with charcoal, filtered, and flask and filter flushed with some methanol.

The solution was transferred to a round-bottom flask with reflux-condenser and mechanical stirrer, and heated to ebullition on the steam-cone. To the boiling solution, 66.5 grams of ammonium thiocyanate were added in one portion, and heating and stirring were continued for 30 minutes. The thiocyanate dissolves, later on a precipitate appears.

The mixture was allowed to stand in the icebox overnight; it was next filtered with suction. The filter-cake was washed first with ice-cold methanol, later exhaustively with water. The product, dried in air, weighed 87 grams (60% of theoretical).

The compound may be recrystallized from hot acetic acid, methanol, ethanol, or large volumes of approximately 0.1 N hydrochloric acid. From the latter solvent, it crystallizes as a granular powder of melting point (M. P.) 183-4° C.

Example II

N-alpha-mercapto-acetyl - ortho-aminophenol having the formula

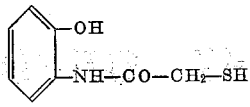

20 grams of the carbamyl compound described above, (the product of Example I) was treated with a mixture of 60 cc. concentrated aqueous ammonia and 60 cc. water. The suspension was heated under reflux on the steam-cone for 10 minutes, whereby the carbamyl-compound dissolved readily. The clear liquid was filtered at once through a Buchner funnel into a flask containing excess ice, and the filtrate was acidified immediately with a small excess of dilute hydrochloric acid (1:1). The N-alpha-mercapto-acetyl-ortho-aminophenol appeared at once as a white precipitate, which was collected on a suction-filter and washed well with water containing a few drops of hydrochloric acid. It was dried in vacuo over phopsphorous pentoxide. Yield, 80%.

Crystallization from methanol containing a few drops of hydrochloric acid, or from water slightly acidified with hydrochloric acid, yields the pure compound, M. P. 133-4° C.

Example III

N-alpha-auro-mercapto - acetyl-ortho-aminophenol having the formula

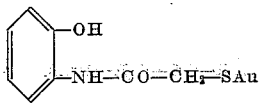

0.01 mole (5.56 grams) of potassium auribromide $KAuBr_4$, was dissolved in 50 cc. of 95% ethanol and reduced to the monovalent state with gaseous sulfur-dioxide. The original, deep reddish brown color turned light yellowish to reddish, with simultaneous formation of a white precipitate of potassium bromide. The flask was stoppered and kept in ice for about 1 hour. The potassium bromide was next filtered off, and the filtrate poured into a solution of 2.01 grams (1.1 mole) of the mercapto compound described above, the product of Example II. The auromercaptide separated at once as a white, flocculent precipitate. The mixture was diluted with excess water, and the gold compound collected on a Buchner funnel. It was washed repeatedly on the filter with water, ethanol and pentane, and dried in vacuo over $P_2O_5$.

It forms a greyish to yellowish powder, which decomposes at 215° C.

Example IV

N-alpha-carbamyl-mercapto-acetyl-meta-aminophenol having the formula

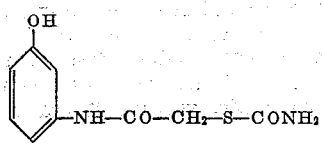

245 grams of monochloroacetic acid and 1 liter of methanol were brought to ebullition on the steam-cone. 200 grams of meta-aminophenol was added in small portions, and some charcoal was added. After filtration, the solution was brought back to the steam-cone and heated to boiling under reflux. 190 grams of ammonium thiocyanate was added, and boiling continued for 1 hour. Vigorous reaction took place. At the end of 1 hour, the mixture was cooled, and the precipitate formed removed by filtration. It consists essentially of ammonium chloride.

Concentration of the alcoholic mother-liquor to a small volume, and chilling, yielded the desired compound, having the formula above indicated, which was filtered with suction, washed with some ice-cold methanol, followed by careful washing with water, and dried in air. Yield, 214 grams (50% of theoretical). Crystallization from methanol containing a few drops of hydrochloric acid, from acetic acid, or from 0.1 N hydrochloric acid gave the pure compound, of M. P. 176° C.

Example V

N - alpha-mercapto-acetyl-meta-aminophenol having the formula

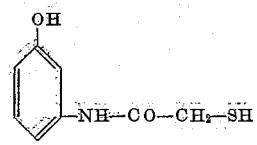

24 grams of N-alpha carbamyl-mercapto-acetyl-meta aminophenol, the product of Example IV, were heated on the steam-cone under reflux, for 10 minutes, with a mixture of 100 cc. conc. aqueous ammonia and 460 cc. of water. The compound dissolved very readily. The mixture was filtered, with suction, into a flask containing excess ice. The filtrate was acidified at once with a small excess of dilute hydrochloric acid. The desired compound, having the formula above indicated, appeared as a white precipitate, which was collected on a filter, washed well with water slightly acidified with hydrochloric acid, and dried in vacuo over phosphorus pentoxide. Yield, 17.5 grams (90% of theoretical). Recrystallization from a small volume of methanol acidified slightly with hydrochloric acid, or from very dilute aqueous hydrochloric acid gave the pure product, M. P. 154° C.

Example VI

N - alpha-auro-mercapto-acetyl-meta aminophenol having the formula

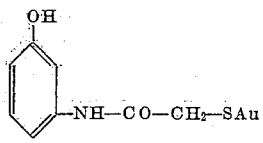

This compound was prepared in accordance with the method used in Example III except that the N-alpha-mercapto-acetyl-meta aminophenol was reacted with the monovalent gold solution described in Example III.

The compound has a decomposition point of 237° C.

Example VII

N-alpha-carbamyl-acetyl-para-aminophenol having the formula

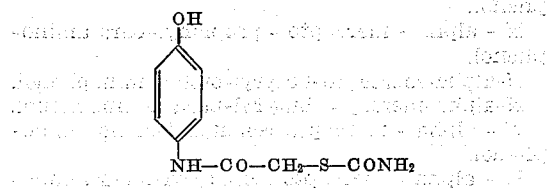

250 grams of monochloroacetic acid was dissolved in 1.5 liters of methanol. The solution was heated to ebullition on the steam-cone, under a reflux condenser, and 200 grams of para aminophenol were added in several portions; the mixture was refluxed, until complete solution was achieved (about 15 minutes). A suspension of 175 grams of ammonium thiocyanate in 500 cc. of methanol was added, and heating was continued for 30 minutes, whereby a moderately strong reaction occurs, in the beginning. Charcoal was added next to the solution, and the suspension was filtered with suction. Crystallization of the desired compound, having the formula above indicated, was brought about by chilling of the filtrate. It was filtered with suction, washed with a small volume of ice-cold methanol, followed by thorough washing with water. It was dried in air. Yield, 187 grams (45% of theoretical). Concentration of the mother-liquor, and addition of excess water gave a second crop of about 15 grams.

The compound was purified by recrystallization from ethanol containing a few drops of hydrochloric acid, or from approximately 0.1 N hydrochloric acid, M. P. 190° C.

Example VIII

N-alpha-mercapto-acetyl-para aminophenol having the formula

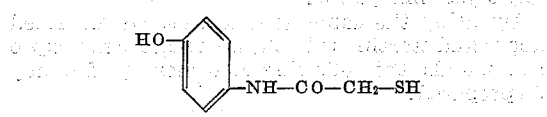

30 grams of N-alpha-carbamyl-mercapto-acetyl para aminophenol, the product of Example VII, were heated for 20 minutes with a mixture of 90 cc. of concentrated aqueous ammonia and 270 cc. of water. The carbamyl compound rapidly went into solution. The liquid was filtered with suction into a flask containing excess ice. The filtrate was acidified immediately with dilute hydrochloric acid. The desired compound appeared as a white precipitate, which was kept in the refrigerator for one day. The compound was next filtered with suction, washed well with water slightly acidified with hydrochloric acid, and dried in vacuo over phosphorus pentoxide. Yield, 20 grams (83% of theoretical).

The compound was purified by recrystallization from methanol containing a small percentage of hydrochloric acid, or from water slightly acidified with hydrochloric acid. M. P. 136° C.

Example IX

N-alpha-auro-mercapto-acetyl-para aminophenol having the formula

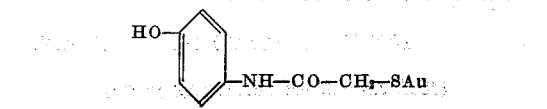

This compound was prepared in a manner similar to the preparation of its ortho and meta isomers, starting with N-alpha-mercapto-acetyl-para aminophenol, in accordance with the method described in Example III. It has a decomposition point of 238–39° C.

Example X

N-alpha-carbamyl-mercapto-propionyl-ortho aminophenol having the formula

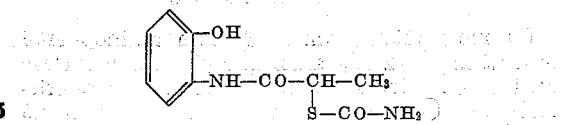

0.1 mole (10.9 grams) of ortho aminophenol, 0.15 mole (23.0 grams) of commercial alpha bromopropionic acid, and 0.15 mole (12.2 grams) of sodium thiocyanate were heated to reflux on a steam cone with 150 cc. of methanol. The mixture was kept refluxing for one hour. In the beginning vigorous reaction occurred. The mixture was next chilled in ice, and the precipitate contained in it was filtered with suction on a Buchner funnel. It was washed with ice cold methanol, followed by thorough washing with water to remove the sodium chloride. The product was finally dried in vacuo over phosphorus pentoxide. Concentration of the alcoholic mother liquor and the wash liquors gave an additional quantity of the desired compound having the above formula. The compound may, if desired, be crystallized from hot acetic acid or from methanol or ethanol containing a few drops of hydrochloric acid.

Example XI

N-alpha-mercapto-propionyl-ortho aminophenol having the formula

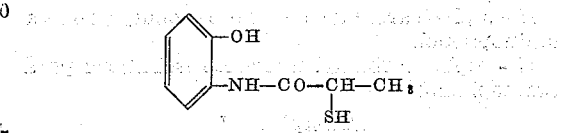

10 grams of the N-alpha carbamyl-mercapto-propionyl-ortho aminophenol, the product of Example X, were treated with 60 cc. of 1:1 mixture of concentrated aqueous ammonia and water by heating on a steam cone for 10 minutes, when the product dissolves readily. The solution was next filtered rapidly by suction through a Buchner funnel into a flask containing excess ice and the filtrate was at once treated with a small excess of hydrochloric acid. The N-alpha-mercapto-propionyl-ortho aminophenol appears as a white precipitate. It was collected on a Buchner funnel, washed with water acidified with a few drops of hydrochloric acid, and dried in vacuo over phosphorus pentoxide.

Example XII

N-alpha-auro-mercapto-propionyl-ortho aminophenol having the formula

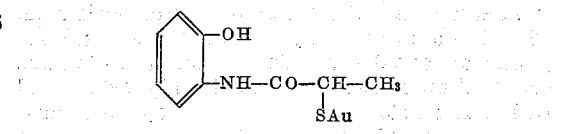

This compound was prepared from the N-alpha-mercapto-propionyl-ortho aminophenol, the product of Example XI, in accordance with the general method described in Example III for the preparation of the corresponding N-alpha-auro-mercapto-acetyl-ortho aminophenol.

Example XIII

N-alpha-carbamyl-mercapto-butyryl-meta aminophenol having the formula

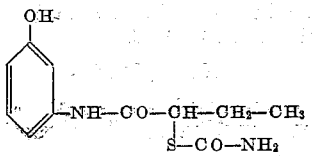

0.1 mole (10.9 grams) of meta aminophenol and 1.5 moles (25.1 grams) of alpha bromobutyric acid were heated to ebullition with 120 cc. of ethanol on a steam cone under reflux. Then 1.5 moles (11.4 grams) of ammonium thiocyanate were added in one portion, going into solution and producing a strong reaction. The mixture was kept refluxing for 35 minutes. A precipitate formed consisting mainly of ammonium chloride which was removed by filtration and the desired compound, the N-alpha carbamyl-mercapto-butyryl-meta aminophenol, obtained from the filtrate by concentration under reduced pressure.

By analogous methods, starting with the appropriate aminophenols and alpha bromo fatty acids, there are obtained the related mercapto carbamyl compounds such as:

N-alpha-carbamyl-mercapto-propionyl-meta aminophenol.
N-alpha-carbamyl-mercapto-propionyl-para aminophenol.
N-alpha-carbamyl-mercapto-butyryl-ortho aminophenol.
N-alpha-carbamyl-mercapto-butyryl-para aminophenol.
N-alpha-carbamyl-mercapto-isobutyryl-ortho aminophenol.
N-alpha-carbamyl-mercapto-isobutyryl-meta aminophenol.
N-alpha-carbamyl-mercapto-isobutyryl-para aminophenol.

Example XIV

N-alpha-mercapto-butyryl-meta aminophenol having the formula

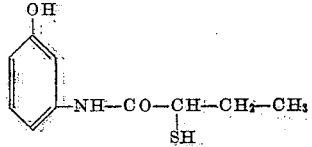

10 grams of N-alpha-carbamyl-mercapto-butyryl meta aminophenol, the compound of Example XIII, were treated with 60 cc. of a 1:1 mixture of concentrated aqueous ammonia and water by heating on a steam cone for 10 minutes, the mercapto carbamyl compound dissolving readily. The solution was next filtered rapidly by suction through a Buchner funnel into a flask containing excess ice and the filtrate was at once treated with a small excess of hydrochloric acid. The N-alpha-mercapto-butyryl-meta aminophenol appeared as a white precipitate which was collected on a Buchner funnel and washed well with water acidified with a few drops of hydrochloric acid and dried in vacuo over phosphorus pentoxide. The compound may be recrystallized from boiling water containing a small amount of hydrochloric acid.

In accordance with the foregoing general method there are obtained from the corresponding appropriate carbamyl mercapto compounds the following:

N-alpha-mercapto-propionyl-meta aminophenol.
N-alpha-mercapto-propionyl-para aminophenol.
N-alpha-mercapto-butyryl-ortho aminophenol.
N-alpha-mercapto-butyryl-para aminophenol.
N-alpha-mercapto-isobutyryl-ortho aminophenol.
N-alpha-mercapto-isobutyryl-meta aminophenol.
N-alpha-mercapto-isobutyryl-para aminophenol.

Example XV

N-alpha-auro-mercapto-isobutyryl-para aminophenol having the formula:

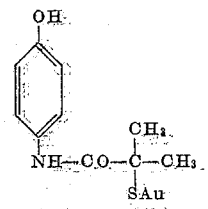

An alcohol solution containing monovalent gold was prepared from 0.01 mole (5.56 grams) of potassium auribromide as described in Example III. This solution was added to a solution in ethanol of 0.0105 mole (2.22 grams) of N-alpha-isobutyryl-para aminophenol, one of the compounds of the preceding example. The N-alpha-auro-mercapto-isobutyryl para aminophenol came down as a voluminous white precipitate which was collected on a filter, washed exhaustively with water and ethanol and dried in vacuo over phosphorus pentoxide. The yield was nearly quantitative. The compound forms a yellowish, not visibly crystalline powder.

By using the same general method described above and starting with the appropriate mercapto compounds, the following gold mercaptides may be prepared:

N-alpha-auro-mercapto-propionyl-meta aminophenol.
N-alpha-auro-mercapto-propionyl-para aminophenol.
N-alpha-auro-mercapto-butyryl-ortho aminophenol.
N-alpha-auro-mercapto-butyryl-meta aminophenol.
N-alpha-auro-mercapto-butyryl para aminophenol.
N-alpha-auro-mercapto-isobutyryl-ortho aminophenol.
N-alpha-auro-mercapto-isobutyryl-para aminophenol.

I claim:
1. The N-alpha-auro-mercapto-acetyl-ortho aminophenol.
2. The N-alpha-auro-mercapto-acetyl-meta aminophenol.
3. The N-alpha-auro-mercapto-acetyl-para aminophenol.
4. N-alpha-auro-mercapto-acetyl aminophenol, $HO.C_6H_4.NH.CO.CH_2SAu$.

MOZES J. (JUDA) LEWENSTEIN.

(References on following page)

REFERENCES CITED

The following references are of record in the file of this patent:

UNITED STATES PATENTS

| Number | Name | Date |
|---|---|---|
| 1,663,390 | Schoeller et al. | Mar. 20, 1928 |
| 1,869,834 | Yoshioka | Aug. 2, 1932 |
| 2,049,198 | Delange | July 28, 1936 |
| 2,412,700 | Weissberger et al. | Dec. 17, 1946 |

FOREIGN PATENTS

| Number | Country | Date |
|---|---|---|
| 555,141 | Great Britain | Aug. 5, 1943 |

OTHER REFERENCES

Beckurts et al., Journal fur praktische Chemie, vol. 174 (neue folge 66) pages 172 to 193 (1902).